United States Patent [19]

Hennekes et al.

[11] Patent Number: 4,500,065
[45] Date of Patent: Feb. 19, 1985

[54] RELEASABLE TOOL MOUNT FOR MANIPULATOR

[75] Inventors: Daniel M. Hennekes, Morrow; David E. Suica, Lebanon; Robert F. Beckman, Cincinnati, all of Ohio

[73] Assignee: Cincinnati Milacron Inc., Cincinnati, Ohio

[21] Appl. No.: 353,512

[22] Filed: Mar. 1, 1982

[51] Int. Cl.³ .............................................. B66C 23/88
[52] U.S. Cl. ..................................... 248/542; 248/544; 81/473; 414/1; 414/5
[58] Field of Search ............... 248/542, 544, 550, 293, 248/478; 403/327–329, 92, 93, 96; 414/1, 5, 729, 730; 294/86 R; 81/472–474

[56] References Cited

U.S. PATENT DOCUMENTS

| | | | |
|---|---|---|---|
| 1,288,611 | 12/1918 | Jones | 248/544 |
| 1,572,142 | 2/1926 | Hood | 403/328 |
| 2,885,918 | 5/1959 | Allimann | 81/474 |
| 3,082,643 | 3/1963 | Grassi | 403/328 |
| 3,095,982 | 7/1963 | Weiser . | |
| 3,247,978 | 4/1966 | Neumeier . | |
| 3,827,820 | 8/1974 | Hoffman | 403/328 |
| 3,830,579 | 8/1974 | Roe | 403/328 |
| 3,843,187 | 10/1974 | Schaefer | 294/86 R |
| 3,963,271 | 6/1976 | Sugino . | |
| 4,026,605 | 5/1977 | Emmerich | 403/328 |
| 4,228,428 | 10/1980 | Niedermeyer | 248/542 |
| 4,392,759 | 7/1983 | Cook | 403/327 |
| 4,412,293 | 10/1983 | Kelley | 414/730 |

FOREIGN PATENT DOCUMENTS

| | | | |
|---|---|---|---|
| 1592797 | 7/1981 | United Kingdom | 248/542 |
| 2068891 | 8/1981 | United Kingdom | 294/86 R |
| 812566 | 3/1981 | U.S.S.R. | 294/86 R |

OTHER PUBLICATIONS

Alexander Binzel Corp.–product brochure.

Primary Examiner—Reinaldo P. Machado
Assistant Examiner—Alvin Chin-Shue
Attorney, Agent, or Firm—John W. Gregg

[57] ABSTRACT

A releasable tool mount is provided for protecting tools carried by a manipulator from damage by excessive forces acting upon the tools irrespective of the direction of the force. The tool mount comprises a tool mounting plate, a housing for receiving the plate, support pins peripherally disposed upon the plate, receptacle placed within the housing for receiving the support pins and preload devices for exerting forces along the long axis of the support pins to maintain their engagement with the receptacle. Relative forces between the housing and the plate, sufficient to overcome the preload force, effect dislodgment of the pins from their associated receptacles. Fluidic sensing means are provided for detecting dislodgement of any pin from its receptacle.

10 Claims, 5 Drawing Figures

RELEASABLE TOOL MOUNT FOR MANIPULATOR

BACKGROUND OF THE INVENTION

This invention relates generally to mechanical manipulators, more commonly known as robots. In particular, this invention relates to devices for mounting tools to the tool positioning element of a manipulator.

In many applications suitable for automation by mechanical manipulators, the tools and their mounting fixtures are specially designed to take best advantage of the dexterity and payload capacity of modern industrial robots. As a consequence, the tooling is typically produced in low volumes and is costly to replace. Various mechanical and electrical devices are employed to protect this tooling against the unpredictable but unavoidable collisions as are apt to occur within the working volume of the manipulator. However, as these devices, like the tooling they are intended to protect, are specially designed for particular applications, they fall short of producing a cost effective solution suitable over a broad range of applications. For example, a mechanical device for protecting against side thrust may well be unsuitable where excessive axial torques are the more probable stress to occur.

Furthermore, where electrical sensing devices are combined with the mechanical devices to detect wreck conditions, the harsh environments in which the manipulators operate severely limit the reliability of the sensors. In particular, workplace contaminants and stray electromagnetic fields combine to impair the correct operation of devices such as proximity switches and contact type limit switches.

It is therefore an object of the present invention to provide a general purpose releasable tool mount for a mechanical manipulator capable of protecting tools against excessive forces irrespective of the direction thereof.

It is a further object of this invention to provide a manipulator tool mount having a removable tool mounting plate releasably retained within a manipulator attachable housing.

It is a further object of this invention to provide a manipulator tool mount having a releasable tool mounting plate responsive to relative forces between the mounting plate and the manipulator irrespective of the direction of such forces.

It is a further object of this invention to provide a manipulator tool mount having nonelectrical sensing means for detecting excessive relative forces between a tool mounting plate and the manipulator.

Further objects and advantages of the present invention shall become apparent from the following description.

SUMMARY OF THE INVENTION

In accordance with the aforesaid objects, a tool mount is provided having a tool mounting plate supported within a housing upon preloaded pins radially disposed upon the plate. Receptacles are placed within the housing sidewalls to receive the pins and restrain them against motion other than along their own longitudinal axes against the preload.

In the preferred embodiment, receptacles are joined by passages to a pressurized fluid supply so that in the event a support pin is dislodged from the receptacle the escaping fluid produces a pressure change in the common supply line detectable by a remote pressure transducer. Further, the mounting plate and housing are joined by a flexible cable to retain the mounting plate in the event all support pins are dislodged. Two arrangements of support pins are described showing alternate preload adjustment accesses.

DESCRIPTION OF THE PREFERRED EMBODIMENT

For purposes of illustrating the invention a breakaway tool mount suitable for application to an industrial robot shall be described in some detail. The particular robot and tool mount used for illustration corresponds to those manufactured by Cincinnati Milacron Inc., the assignee of the present invention.

Figure 1:
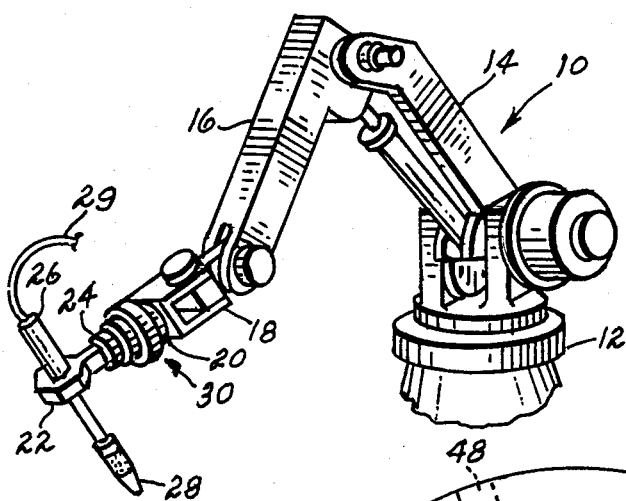
FIG. 1 is an isometric view of a mechanical manipulator with the tool mount attached to the end effector and supporting a tool and tool fixture.

Referring to FIG. 1, the industrial mechanical manipulator 10 includes a rotatable shoulder 12 to which is tied an upper arm 14 followed by a forearm 16 and a wrist 18 having two degrees of freedom. Rotation is provided to the end effector 20 attached to wrist 18 and upon which tooling is to be mounted. Shown in this Fig. are the releasable tool mount 30 supporting the tool fixture 22 upon its mounting base 24. Held within fixture 22 is the torch 26 having a flame nozzle 28 and attached to feed line 29. It will be appreciated that the working volume within which torch 26 may be positioned is defined by the relative degrees of motion permitted for the shoulder 12, upper arm 14, forearm 16 and wrist 18, in conjunction with the rotation of end effector 20.

Figure 2:
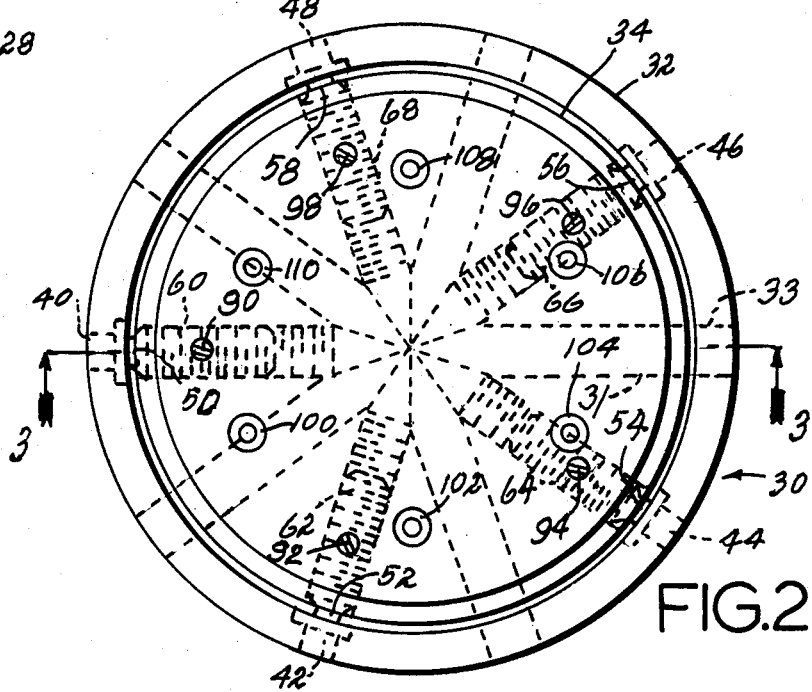
FIG. 2 is a top view of the first tool mount assembly.

Referring to FIG. 2, the tool mount 30 is seen in a top view with tool mounting plate 34 supported within the recess of housing 32. The housing 32 would in use be attached to end effector 20 of robot 10. In this view, receptacles 40 through 48 disposed within the side walls of housing 32 are seen in phantom. The support pins 50 through 58 attached to mounting plate 34 are shown in their radial disposition upon mounting plate 34 and in communication with the receptacles 40 through 48. Mounting holes 100 through 110 are provided within mounting plate 34 to attach the fixture base 24 of tooling support 22. Support pins 50 through 58 are seen as projecting from preload devices 60 through 68 shown in phantom within mounting plate 34.

Figure 3:
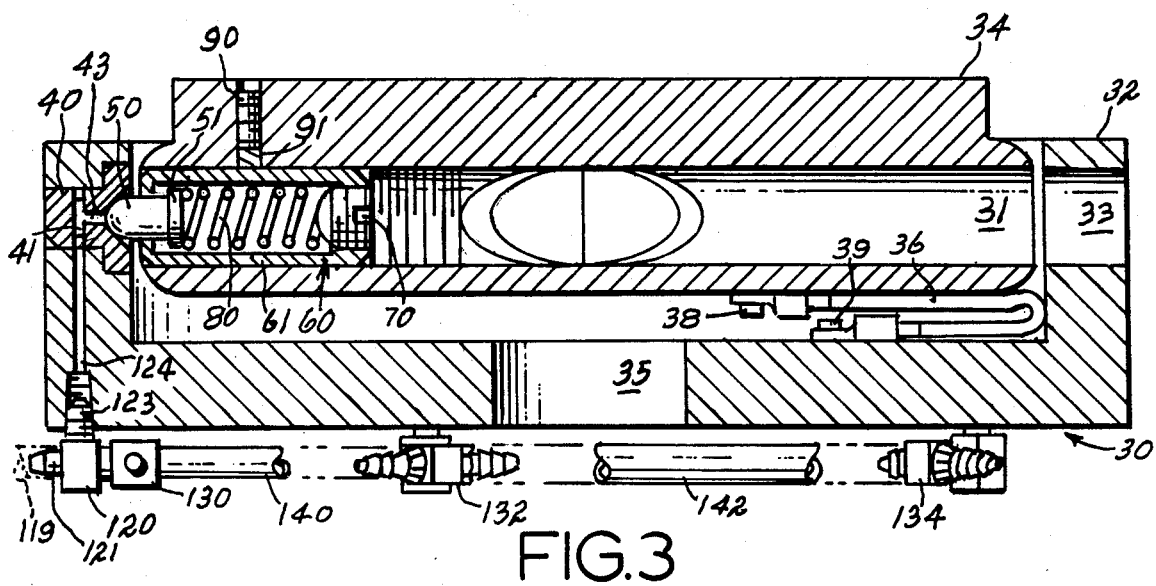
FIG. 3 is a sectional view taken along line 3—3 of FIG. 2 showing details of the receptacle, support pin and preload device.

Referring to FIG. 3, the section shows the mounting plate 34 supported within the recess of housing 32 and reveals the details of a single preload device 60. Support pin 50 projects from preload body 61 and the hemispherical end thereof is received by receptacle 40 at a chamfered depression. Preload device body 61 is provided with external threads matching the threads of bore 31 provided within mounting plate 34 to permit longitudinal location of the preload device 60 within mounting plate 34. A locking block 91 is compressed against the threads of preload device body 61 by adjustment of set screw 90 to hold the preload device 60 in position within bore 31. Set screws 92 through 98 of FIG. 2 lock preload devices 62 through 68 in position in a like manner. The preload force holding support pin 50 against the chamfer of receptacle 40 is provided by means of the preload spring 80 held within preload device body 61 by means of adjustment screw 70. As total tension of preload spring 80 is determined by the compression effected against adjustment screw 70, access to adjustment screw 70 is provided through housing 32 by bore 33 and mounting plate 34 by bore 31 as seen in the section and as seen in phantom in FIG. 2. Support pin 50 is provided with a positive stop flange 51 limiting its motion away from adjustment screw 70 and retaining it within preload device body 61. A similar arrangement is incorporated in each preload device 62 through 68. Additionally, adjustment access is provided for each preload device 62 through 68 in the same manner as access is provided to preload device 60 by bore holes through housing 32 and mounting plate 34 which are shown as phantom lines in FIG. 2.

Continuing with reference to FIG. 3, means are provided to admit pressurized air through housing 32 to receptacle 40 by means of cross block 120. The pressurized air supply enters block 120 at nozzle 121 via supply line 119 and enters the receptacle through nozzle 123 and shaft 124 in housing 32. The receptacle 40 is provided with a connecting port 41 which in turn intersects outlet port 43 connected to the chamfered depression where the hemispherical end of support pin 50 creates a seal against escaping pressurized air. In the event a relative force between housing 32 and mounting plate 34 is sufficient to effect dislodgement of support pin 50 from receptacle 40, outlet port 43 will be at least partially opened causing a pressure drop in the pressurized air admitted through nozzle 121. Each of the receptacles 42 through 48 are likewise provided with pressurized air and incorporate outlet ports sealed by support pins 52 through 58 respectively. All receptacles are provided with the pressurized air from the single supply at nozzle 121 by means of connecting blocks 130, 132, 134 as well as additional connecting blocks not shown in FIG. 3. Tubes 140 and 142 are used to interconnect connecting blocks shown in FIG. 3 and similar connecting tubes interconnect the remaining connecting blocks not shown in this Fig. The connecting tubes are located around the periphery of the bottom of housing 32 so as not to interfere with attachment to the end effector.

Further with reference to FIG. 3, a retaining cable 36 is shown connected to housing 32 by bolt 39 and to mounting plate 34 by bolt 38. In the event that all support pins 50 through 58 are dislodged from their receptacles 40 through 48, the mounting plate 34 is totally unsupported by housing 32 and retained in connection therewith by flexible cable 36.

Regarding the operation of the tool mount, it is to be appreciated that housing 32 is rigidly affixed to end effector 20 and is aligned thereon by locating shaft 35. In the event there is any relative force between housing 32 and mounting plate 34, the chamfered depressions of receptacles 40 through 48 tend to exert a force on support pins 50 through 58 in the direction opposite that effected by the compression of the preload springs. Once any support pin 50 through 58 is dislodged partially from its receptacle 40 through 48, the pressure drop in supply line 121 can be detected by a remote signal unit not shown. The signal unit need only incorporate a pressure drop sensor and signal generator suitable for providing an indication that at least one pin is dislodged. The signal unit may then alert the operator or be tied directly to a control unit for controlling operation of the manipulator.

By virtue of the construction of the tool mount any oblique force acting upon tool support 22 will tend to cock the tool mounting plate 34 with respect to tool housing 32. As previously described, this relative motion is translated via the chamfered depressions of receptacles 40 through 48 and the hemispherical ends of support pins 50 through 58 into forces active along the longitudinal axes of the affected preload devices so as to effect further compression of the preload springs and motion of the affected support pins 50 through 58 away from receptacles 40 through 48 and towards the center of mounting plate 34. In addition, relative twisting between housing 32 and mounting plate 34 likewise results in motion of the affected support pins 50 through 58 away from the respective receptacles 40 through 48. Thus the tool mount is responsive to any relative force between mounting plate 34 and housing 32 irrespective of the direction of such force.

Figure 4:
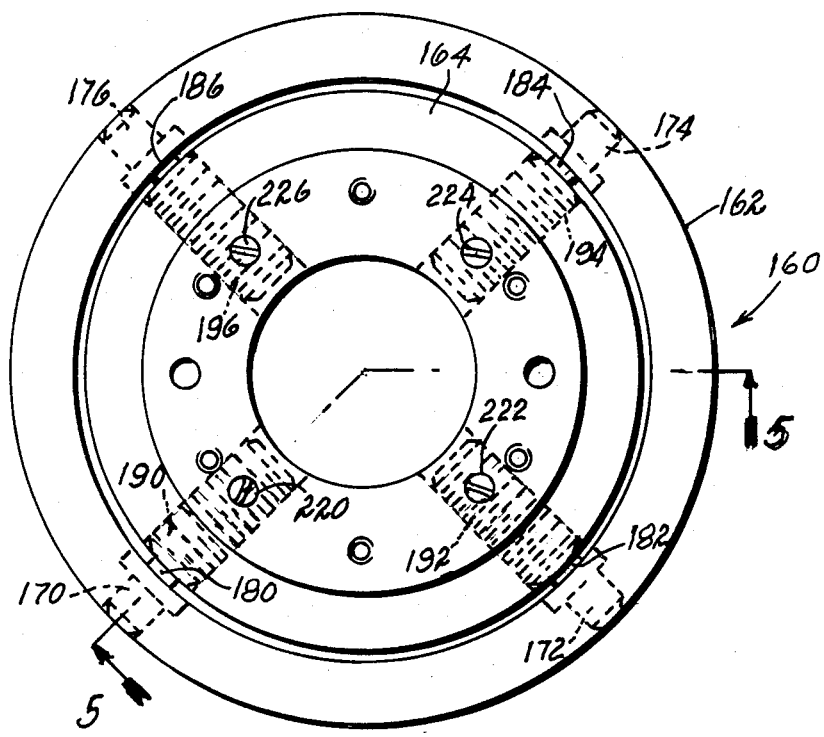
FIG. 4 is a top view of an alternative tool mount assembly.
Figure 5:
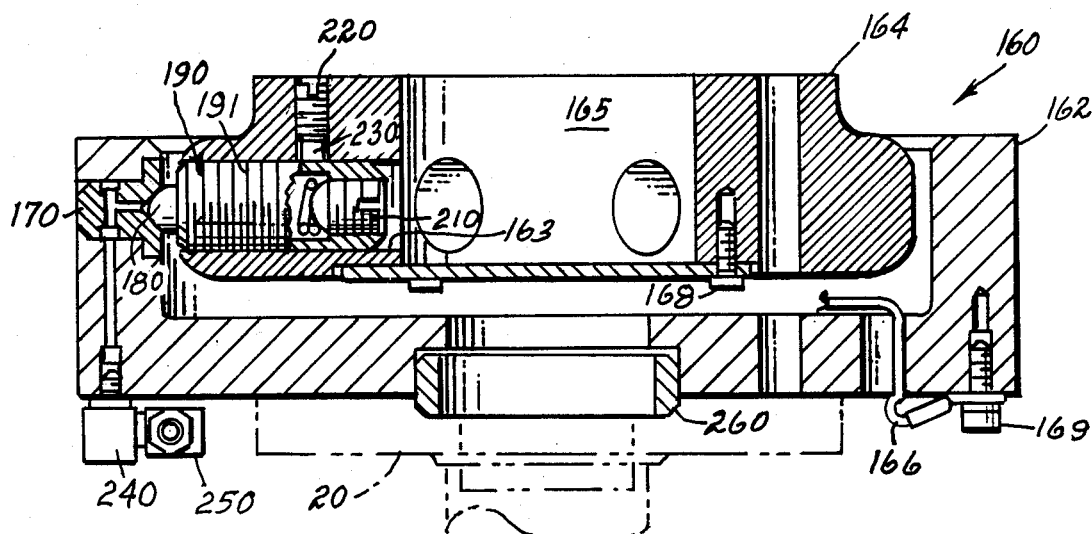
FIG. 5 is a sectional view taken along line 5—5 of FIG. 4.

Referring now to FIGS. 4 and 5, the alternative embodiment of tool mount 160 is shown. In these Figs., tool mount plate 164 is shown supported within the recess of housing 162 by support pins 180 through 186 in cooperation with receptacles 170 through 176. Housing 162 is shown located by locating block 260 upon end effector face plate 20 of manipulator 10. Preload devices 190 through 196 which hold support pins 180 through 186 against the chamfers of the associated receptacles are in all respects similar to the preload devices previously described. Preload devices 190 through 196 are again held in place within mounting plate 164 by locking blocks and set screws 220 through 226. Particularly referring to the section of FIG. 5, locking block 230 is shown in engagement with the external threads of preload device body 191. Continuing with reference to FIG. 5, receptacle 170 is shown supplied with pressurized air through block 240 which is in turn connected to a common supply line via T block 250. Each receptacle 170 through 176 is provided with pressurized air for sensing dislodgment of a support pin 180 through 186 from its associated receptacle 170 through 176.

Operation of the tool mount of FIGS. 4 and 5 is in all respects similar to the operation of the tool mount of FIGS. 2 and 3, the primary difference being in the access to the preload adjustment screws. Referring to FIG. 5, it is seen that preload adjusting screw 210 is accessible through the central shaft 165 in mounting plate 164 which intersects the preload device locating bore 163. The flexible retaining cable 166 is fixed to housing 162 by bolt 169 and fixed to mounting plate 164 by bolt 168.

It will be appreciated by those skilled in the art that various arrangements of preload devices and support pins upon mounting plates 164 or 34 will yield variations in forces required to dislodge support pins from receptacles within the housings. It is not the intent of applicants to limit the scope of the present invention to embodiments comprising only the number or particular arrangement of support pins shown in the two embodiments previous described. Rather, it will be recognized by those skilled in the art that other arrangements may be dictated by the peculiarities of particular applications taking into consideration the anticipated loads to be supported by the combination of mounting plate, preload devices, support pins and receptacles. While applicants have chosen to use a disc shaped mounting plate with radially disposed support pins and preload devices to accomodate the broadest range of applications, it is recognized that in particular cases, other shapes and other dispositions of support pins and preload devices may be suitable.

While the invention has been illustrated in some detail according to the preferred embodiments shown in the accompanying drawings, and while the preferred illustrated embodiments have been described in some detail, there is no intention to thus limit the invention to such detail. On the contrary, it is intended to cover all modifications, alterations, and equivalents falling within the spirit and scope of the appended claims.

What is claimed is:

1. Apparatus for releasably mounting tools to a mechanical manipulator comprising:
   a. a tool mounting plate;
   b. a housing having a recess, defined by the walls of said housing, for receiving the mounting plate and a surface for attachment to the manipulator;
   c. a plurality of support pins disposed peripherally upon the mounting plate, each support pin having a free end projecting beyond the periphery of the plate and a second end retained by the mounting plate;
   d. a plurality of pin receptacles disposed within the side walls of the recess, each receptacle receiving the free end of a support pin, the support pins and receptacles suspending the mounting plate within the recess such that a relative force between the mounting plate and housing, irrespective of the direction thereof, effects relative motion of the mounting plate and housing; and
   e. preload means attached to the mounting plate for resisting forces acting along the longitudinal axes of the support pins in the direction away from the receptacles, each preload means being connected between the second end of a support pin and the mounting plate, the magnitude of the relative force between the mounting plate and housing required to release the mounting plate being determined by the force required to overcome the preload resistance to dislodge at least one support pin from its associated receptacle.

2. The apparatus of claim 1 further comprising means for adjusting the preload force exerted upon the support pins.

3. The apparatus of claim 1 further comprising retaining means for holding the mounting plate in flexible connection with the housing in the event of dislodgement of all support pins from their respective receptacles.

4. The apparatus of claim 1 wherein the preload means are threadably engaged with the mounting plate and relocatable along the axes upon the support pins are disposed.

5. The apparatus of claim 1 wherein each receptacle is provided with a chamfered depression for receiving a support pin and wherein the free end of each support pin is hemispherical in shape and seats against the chamfer of the depression.

6. The apparatus of claim 5 further comprising fluidic sensing means for detecting dislodgement of a support pin from its seat in the chamfer.

7. The apparatus of claim 1 wherein the mounting plate is disc shaped and wherein the recess forms a concentric circle therearound and the support pins are disposed along radii emanating from the center of the mounting plate.

8. The apparatus of claim 7 further comprising means for adjusting the preload force exerted upon the support pins.

9. The apparatus of claim 8 wherein access to the adjusting means is provided through the periphery of the housing and along a radius projecting from the center of the mounting plate.

10. The apparatus of claim 8 wherein access to the adjusting means is provided via a shaft through the center of the mounting plate.

* * * * *